United States Patent
Hagelthorn

(10) Patent No.: US 8,745,875 B1
(45) Date of Patent: Jun. 10, 2014

(54) ULTRAHIGH-INTEGRITY INTERLOCKING NUT AND WASHER SYSTEM FOR TRAILER AXLES

(71) Applicant: George A. Hagelthorn, Vya, NV (US)

(72) Inventor: George A. Hagelthorn, Vya, NV (US)

(*) Notice: Subject to any disclaimer, the term of this patent is extended or adjusted under 35 U.S.C. 154(b) by 8 days.

(21) Appl. No.: 13/685,045

(22) Filed: Nov. 26, 2012

(51) Int. Cl.
   *B21D 53/10* (2006.01)

(52) U.S. Cl.
   USPC ............ 29/898.062; 29/724; 29/898.07; 29/898.08; 29/898.09; 384/540; 384/583; 411/14.5

(58) Field of Classification Search
   CPC ................. F16C 35/077; F16C 35/067
   USPC ........... 29/898.07, 898.08, 898.09, 724, 252, 29/898.062; 384/540, 583; 411/14.5
   See application file for complete search history.

(56) References Cited

U.S. PATENT DOCUMENTS

| | | | |
|---|---|---|---|
| 4,971,501 A * | 11/1990 | Chavez | 411/221 |
| 5,366,300 A * | 11/1994 | Deane et al. | 384/585 |
| 5,533,849 A * | 7/1996 | Burdick | 411/120 |
| 5,560,687 A * | 10/1996 | Hagelthorn | 301/105.1 |
| 5,795,037 A | 8/1998 | Hagelthorn | |
| 5,967,721 A * | 10/1999 | Giachinta et al. | 411/7 |
| 6,089,673 A * | 7/2000 | Wiacek et al. | 301/105.1 |
| 6,557,245 B2 * | 5/2003 | Beduhn et al. | 29/724 |
| 7,000,995 B2 | 2/2006 | Hagelthorn | |
| 7,108,428 B2 * | 9/2006 | Ason et al. | 384/583 |
| 7,346,985 B1 * | 3/2008 | Strait | 29/898.09 |
| 7,389,579 B2 * | 6/2008 | Rode | 29/724 |
| 7,547,077 B2 * | 6/2009 | Melberg et al. | 301/108.1 |
| 7,927,052 B1 * | 4/2011 | Varden | 411/221 |
| 8,011,866 B2 * | 9/2011 | Harris | 411/150 |
| 8,403,611 B2 * | 3/2013 | Friesen et al. | 411/197 |
| 8,540,470 B2 * | 9/2013 | Dillon et al. | 411/198 |
| 2003/0035699 A1 * | 2/2003 | Harris | 411/161 |
| 2006/0147294 A1 * | 7/2006 | Rode | 411/246 |
| 2007/0211973 A1 * | 9/2007 | Rode | 384/448 |
| 2011/0316325 A1 * | 12/2011 | Martin et al. | 301/105.1 |
| 2012/0292137 A1 * | 11/2012 | Yoshikawa et al. | 188/71.7 |
| 2013/0125369 A1 * | 5/2013 | White et al. | 29/428 |
| 2013/0239395 A1 * | 9/2013 | Schuster et al. | 29/464 |

* cited by examiner

*Primary Examiner* — Richard Chang
(74) *Attorney, Agent, or Firm* — Gifford, Krass, Sprinkle, Anderson & Citkowski, P.C.

(57) ABSTRACT

An interlocking nut and washer system complies with new standards identified in the Society of Automotive Engineers (SAE) Recommended Practice J2535, Setting Preload in Heavy-Duty Wheel Bearings, and with maintenance recommendations issued by the Technology Maintenance Council (TMC) Recommended Practice RP618, Wheel Bearing Adjustment Procedure. The system includes an improved inner washer, adjustment nut, intermediate washer, and outer nut that interlocks with the intermediate washer following the introduction of an established level of preload force by the adjustment nut. The inner washer isolates the adjustment nut from the inner bearing race to eliminate frictional wear. An increase in outer diameter of the inner washer provides an interference capability that serves as a safety factor to prevent separation of the wheel hub from the axle spindle in event of bearing failure. The inner washer includes markers to establish the final adjusted preload or the endplay position of the adjustment nut.

17 Claims, 6 Drawing Sheets

ULTRAHIGH-INTEGRITY INTERLOCKING NUT AND WASHER SYSTEM FOR TRAILER AXLES

FIELD OF THE INVENTION

This invention relates generally to mechanical interlocks for threaded axle spindles, and the like and, more particularly, to a high-integrity nut and washer system finding utility in applying and maintaining either the condition of desired preload force against roller bearings or an ideal measure of end play applied during installation of wheels and hubs on commercial carrier trailer axles.

BACKGROUND OF THE INVENTION

Recently, the Society of Automotive Engineers (SAE) Recommended Practice J2535, Setting Preload in Heavy-Duty Wheel Bearings was reviewed in the interest of eliminating vague phraseology and to provide more specific detail by adding the following definition: Target Preload Setting—the preload force value that is the preliminary level of adjustment from which the final wheel bearing adjustment can be achieved. This is the first instance in having an absolute value of preload force identified that can be used as the basis for recommended preload installation procedures. Now it is possible for spindle nut manufacturers to develop instructions on how their products can be used to install controllable and repeatable preload.

In addition to setting controlled preload, the teachings of the UltraHigh-Integrity Interlocking Nut and Washer System can be used to establish and securely lock the adjusted amount of end play or axial clearance as defined in SAE Recommended Practice J2535. The means to accomplish this are described in the Technology and Maintenance Council (TMC) Recommended Practice RP 618, Wheel Bearing Adjustment Procedures.

At the present time, there are no specific standards or recommendations stating the maximum limit for preload, but from a practical standpoint, the value eventually recommended should be in the same order that provides the measured retardation-which normally exists in wheel-end systems installed with endplay. Wheel bearing engineers have suggested that a range of 2 to 5 pounds of preload force would be acceptable, but they also state that the spindle nut manufacturers are responsible for establishing the specific maximum amount of allowable preload force. Conjecture about this will be resolved following action by the TMC to provide a revised recommended practice describing how to secure an acceptable amount of preload after the reaching the 50 foot pound spindle nut torque level prior to initiating back-off rotation described in the TMC Recommended Practice 618.

U.S. Pat. Nos. 5,795,037 and 7,000,995 disclose systems and methods used to install precise levels of preload on tapered roller bearings of the type used in conventional wheel-end systems of highway trailers. However, the principles described therein only apply to double-jam nut systems. With the new guidelines now established within the tractor-trailer industry, it will now be possible for all spindle nut manufacturers to issue new instructions for installing controlled preload to their existing single nut systems.

SUMMARY OF THE INVENTION

This invention improves on the existing art by providing an interlocking nut and washer system exhibiting a higher degree of controlled preload adjustability for industry standard tractor/trailer axle spindles. The preferred embodiment includes an inner washer, an adjustment nut, an intermediate washer, and an outer nut completing an interlock assembly. The system and method establishes and maintains a desired degree of preload force relative to tapered roller bearings mounted on a threaded axle spindle having a predetermined pitch.

The system comprises, in order closest to the bearings an inner tabbed washer having a keyway tab and an outer face inscribed with radial reference lines to serve for incremental positioning of an inner adjustment nut; the inner adjustment nut; an intermediate interlock washer with a keyway tab, an external peripheral tab, and an outer face with one or more projections providing the first portion of a mechanical interlock with an outer retainer nut; and the outer retainer nut having an inner face providing the second portion of the mechanical interlock.

In accordance with the invention, the second portion of the mechanical interlock includes a plurality of spaced-apart physical features related to the predetermined pitch of the spindle, such that tightening the outer retainer nut causes the second portion of the mechanical interlock to become trapped by the first portion of the mechanical interlock after sufficient axial inward movement of the outer retainer nut has introduced the needed amount of additional preload force to maintain engagement of the interlock portions.

In the preferred embodiment, the physical features of the first portion of the mechanical interlock are projections, and the second portion of the mechanical interlock comprises a plurality of radial slots designed to entrap the projections. The physical features of the first and second portions of the mechanical interlock are such that the depth of engagement is established by the pitch of the threads of the components involved and the degrees of rotation applied to the outer retainer nut in the interest of controlling the depth of penetration of the projections of the first portion within the second portion at which point disengagement of the two portions of the mechanical interlock is effectively resisted.

Once the controlled position of the first and second portions of the mechanical interlock has been established, the assembled components can be further secured by bending the peripheral tab of the intermediate interlock washer over the flat of the outer retainer nut to prevent inadvertent movement. Additional mechanical integrity may be achieved by applying a measure of torque with counterclockwise rotation to the adjustment nut resulting in a jammed condition within the components.

The inner tabbed washer may be marked with radial reference lines in 15 degree segments to aid in the appropriate positioning of the inner adjustment nut. The 15 degree segments may be used to produce a level of preload after the installation torque of 50 foot pounds has been reduced to realize preload force between 0 and 2 pounds force achieved by a controlled number of degrees of counterclockwise rotation of the adjustment nut within the predetermined range applicable to trailer axles having 2⅝ inch spindles with 16 threads per inch. The 15 degree segments may also be used to establish a level of endplay after the installation torque of 50 foot pounds has been reduced to realize an endplay adjustment between 0.000" and 0.005" achieved by a controlled number of degrees of counterclockwise rotation of the adjustment nut within the predetermined range applicable to trailer axles having 2⅝ inch spindles with 16 threads per inch.

A method of establishing and maintaining a desired level of preload force relative to tapered roller bearings mounted on a threaded axle spindle having a predetermined pitch and a keyway, the method comprising the steps of:

placing a tabbed inner washer on the spindle with the tab engaged with the keyway;

placing an adjustment nut on the spindle against the inner washer;

tightening the adjustment nut with approximately 50 foot pounds of torque;

(Preload Option)

backing off the adjustment nut with approximately 45 degrees of rotation to achieve a desired level of rotational resistance (DRAG) when turning the wheel;

placing a tabbed intermediate washer onto the spindle against the adjustment nut with the tab engaged within the keyway;

placing an interlock retainer nut onto the spindle against the intermediate interlock washer;

wherein the intermediate interlock washer and interlock retainer nut have adjoining faces with coordinating spaced-apart projections and recesses; and tightening the interlock retainer nut until the projections penetrate into the recesses to the degree that restricts further tightening.

(Endplay Option)

backing off the adjustment nut with approximately 50-60 degrees of rotation to achieve an acceptable amount of endplay in compliance with TMC Recommended practices;

placing a tabbed intermediate interlock washer onto the spindle against the adjustment nut with the tab engaged within the keyway;

placing an interlock retainer nut onto the spindle into contact with the intermediate interlock washer;

wherein the intermediate interlock washer and the interlock retainer nut have adjoining faces with coordinating spaced-apart projections and recesses; finger-tightening the interlock retainer nut until the projections initially partially engage the recesses while avoiding deep penetration of the interlocking components;

Having achieved either controlled preload or controlled endplay, the installation is completed by bending the peripheral tab on the intermediate interlock washer over a flat on the interlock retainer nut and applying back-off rotation of the inner adjustment nut to achieve a jammed condition within the nut retention system.

The improved design enables the use of a thinner tabbed intermediate interlock washer because the shear force applied against the keyway tab during the final adjustment nut back-off jamming operation has been substantially reduced. The use of a bend-over tab on the intermediate washer provides an additional safety factor to prevent loosening of the fastener system.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE INVENTION

Figure 1:
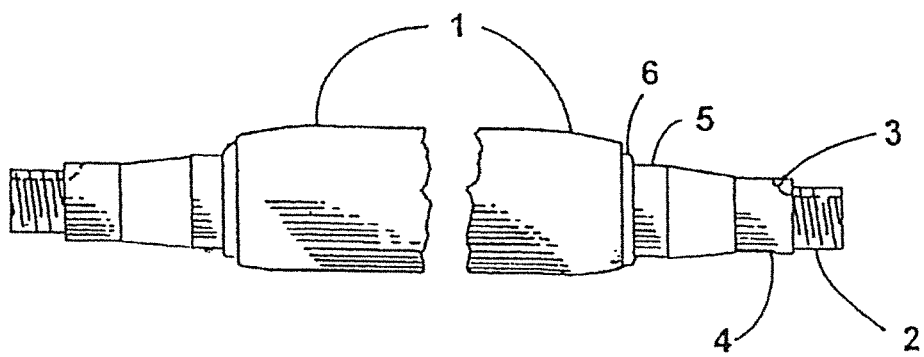
FIG. 1 is a plan view of an axle beam without any accouterments showing the two spindles in final form following the machining operations.

This invention improves on the existing art by providing an interlocking nut and washer system exhibiting a higher degree of controlled preload adjustability for industry standard tractor/trailer axle spindles than previously possible. The preferred embodiment includes an inner washer, an adjustment nut, an intermediate washer, and an outer nut completing an interlock assembly. The performance of this new configuration is enhanced by the fact that the retainer nut will positively interact to engage with the intermediate adjustment nut using the existing controlled preload force that has been applied.

In this fastening system, the inner washer is used to isolate the adjustment nut from contact with the bearing. In addition to eliminating friction contact between the bearing race and the adjustment nut, the inner washer has an increased outer diameter that introduces an interference barrier to resist separation of the wheel from the axle spindle in event of bearing failure. The enlarged inner washer serves to engage the bearing outer race if the hub moves axially outward on the axle spindle after bearing failure occurs.

In the course of studying how various levels of torque applied on the adjustment nut introduces correlating preload force against the tapered roller bearings, it was discovered that a unique graphic representation between levels of preload force and the degrees of spindle nut rotation assumed the shape of an exponential curve. The slope of the curve leveled out with a gradual decreasing amount of preload force as the adjustment nut was rotated in the back-off mode through 45 degrees. At 45 degrees of back-off rotation, the preload force amounts to less than 4 pounds. With an additional 15 degrees of spindle nut back-off rotation, the preload force diminishes to a value less than ½ pound. This discovery also identified a significant 30 degree range of spindle nut angular adjustment that enables repeatable and controlled preload to be installed.

To better assist in the reaching the ideal position of the adjustment nut where a specific level of preload is achieved, there are scribed radial lines on the face of the washer that indicate the amount of additional back-off movement needed for the adjustment nut after the initial 45 degree back-off rotation from the 50 foot pound spindle nut torque position. The spacing of the radial lines was determined in precise laboratory testing in the interest of determining how much additional loosening of the adjustment nut from the 45 degree back-off position is needed to reach the ideal level of preload. This was determined to be 15 degrees of rotation. Using the apex of the adjacent flats of the octagonal adjustment nut in conjunction with scribed reference marks on the inner washer, the nut is rotated counterclockwise 15 degrees into a similar relative position with respect to the next scribed line. Continuing to loosen the adjustment nut another 15 degrees into alignment with the next radial scribed line on the inner washer causes the adjustment nut to approach the condition where endplay will originate. After choosing what level of adjustment is desired, the position of the adjustment nut is securely locked with the installation of the intermediate interlock washer and interlock retainer nut.

While the invention may be applied in different ways, the system is particularly suited to the controlled preload adjustment of tapered roller bearings. In this case, the system is provided on the spindle end of an axle, which mounts a wheel assembly that includes tapered roller bearings. After positioning the tabbed inner washer to engage within the spindle keyway while abutting against the outer tapered roller bearing, the adjustment nut is threaded into position having torque applied to it in a controlled manner to achieve the intended installation adjustment.

Either a slight dimensional clearance between the inner washer and the adjustment nut can be provided or a specific preload bearing force against the outer tapered roller gearing can be applied. Thereafter, the intermediate washer that has interlock capability with the outer nut positioned on the axle and is rotationally fixed with respect to spindle keyway engagement.

In the preferred embodiment, the locking mechanism provides a plurality of radially oriented grooves on the inner face of the outer nut that interlock with the projections on the outer face of the intermediate washer. It will be appreciated that other interlocks may be used, such as dimples and divots, or that the projections may be provided on the nut with the corresponding groves placed on the intermediate washer.

In use, the grooves on the face of the threaded retainer nut are moved into interlocking contact with the projections on the intermediate washer. This is accomplished by tightening the retainer nut against the projections on the face of the intermediate washer, causing the projections to engage and disengage with slot spaces as rotation of the retainer nut advances. Using this procedure, the installer will sense the interference of the projections within the slots. With an additional amount of torque on the retainer nut, the initial slots will be caused to separate from the projections and to move onward allowing the second set of slots of the retainer nut to securely engage the projections on the intermediate washer.

The shape of the projections on the intermediate washer is such that disengagement from the first set of slots of the retainer nut can be readily accomplished with a light clockwise application of torque on the retainer nut. With this additional clockwise rotation of the retainer nut, the projections on the intermediate washer will engage the second set of slots in the retainer nut with sufficient depth to prevent further rotation even if significant torque is applied. This results in an automatic position sensing arrangement that prevents the retainer nut from being tightened excessively. At this point, if desired, the inner adjustment nut can be caused to rotate counterclockwise "in the second direction" to provide a jamming force against the assembled retainer nut and intermediate washer to achieve a securely locked condition. On achieving this interlock it is not possible for the outer retainer nut to be moved because engagement of its grooves with the projections on the intermediate washer will resist any further rotation. At this point the entire wheel-end assembly can be additionally secured by bending the external tab on the intermediate washer into contact with the adjoining flat of the outer retainer nut to prevent inadvertent loosening.

It should be recognized that once the adjustment nut is tightened to a condition of either preload or endplay, its position on the axle spindle is established and the installation of the intermediate washer and the retainer nut will prevent any outward axial movement. Being securely held at that position assures the initial adjustment cannot be caused to move axially outward regardless of the amount of torque that may be applied if the adjustment nut in caused to rotate "in the second direction" to effect a jam condition. This is a procedure that will provide either controlled preload or endplay depending on the original controlled position of the adjustment nut.

With this new design, it is not necessary to apply the back-off procedure described in previous U.S. Pat. Nos. 5,795,037 and 7,000,995 to jam the double nut assembly, but this back-off rotation of the adjustment nut is an option that can be employed to assure a tighter fit of the components. Disassembly of the wheel-end system will first require the adjustment nut to be retightened with clockwise rotation applying 50 foot pounds of torque to allow for disengagement of the projections on the intermediate interlock washer from within the slots of the interlock retainer nut.

Figure 2:
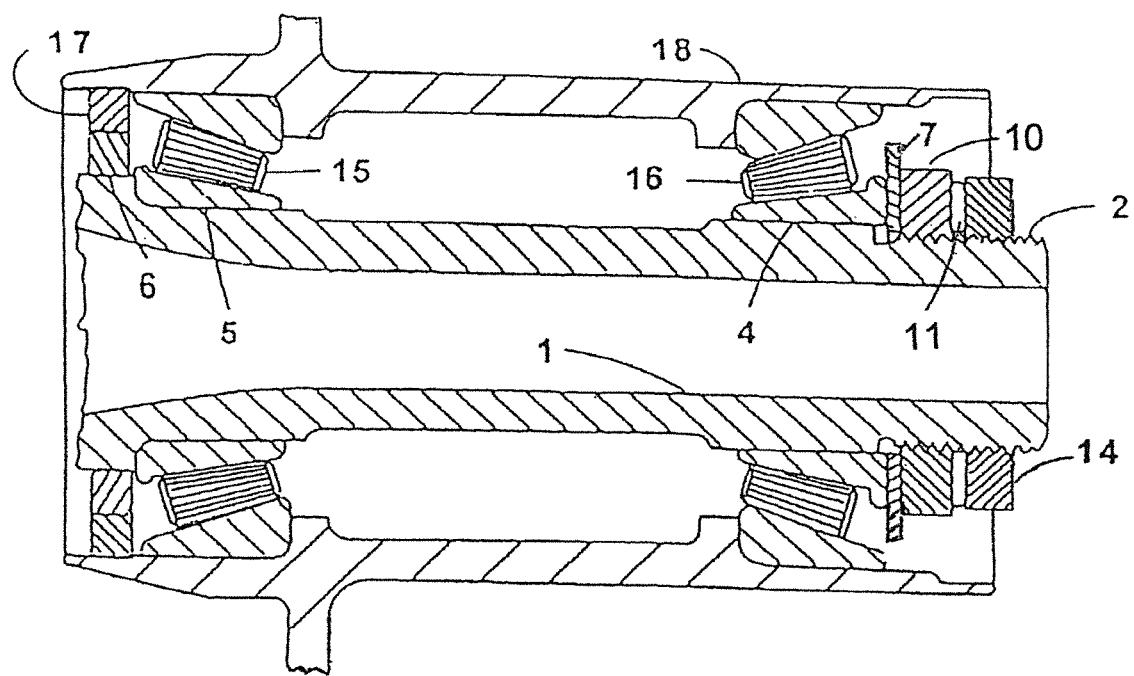
FIG. 2 is a section view of the axle spindle in FIG. 1 having assembled thereon the components comprising the wheel and axle assembly, which includes an inner washer, an inner means, an intermediate interlocking washer, and an outer interlocking means, showing the respective relationship of all members in their final assembled positions.

Reference is now made to the drawings, wherein FIG. 1 depicts a prior-art axle beam 1 having conventional threads 2, a washer keyway 3, an outer bearing journal 6. Referring to FIG. 2, an oil seal 17 is shown in its respective position mounted between wheel or hub 18 and the axle spindle 1. Inner tapered roller bearing 5 is positioned between the wheel or hub 18 and the bearing journal 5. An outer tapered roller bearing 16 is also positioned in its working arrangement between the wheel or hub 18 and the outer bearing journal 4 of the axle spindle 1.

Figure 3:
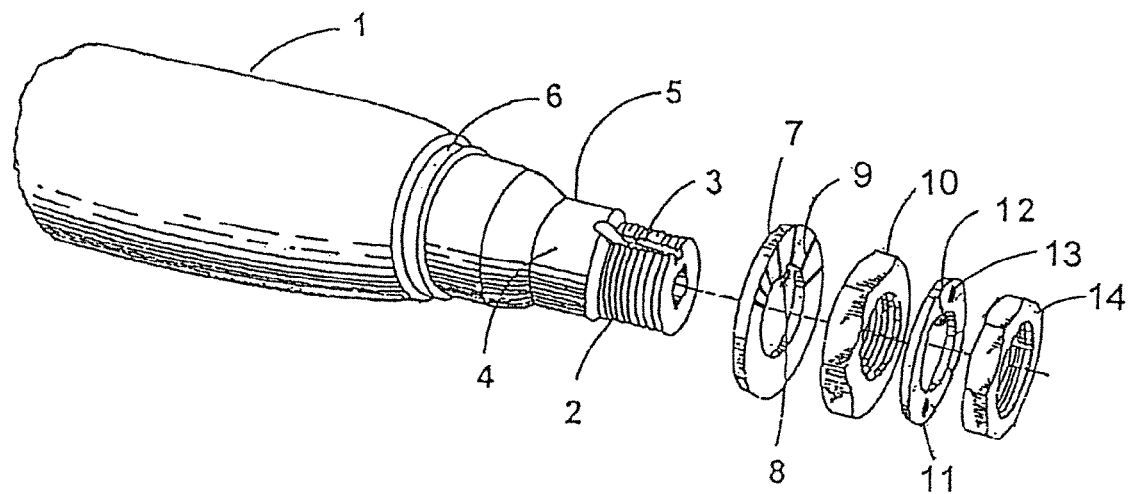
FIG. 3 is an exploded perspective view of the components of the preferred embodiment of the axle nut system of the present invention that includes an inner washer, an inner adjustment nut, an intermediate interlocking washer and an interlocking retainer member.
Figure 4:
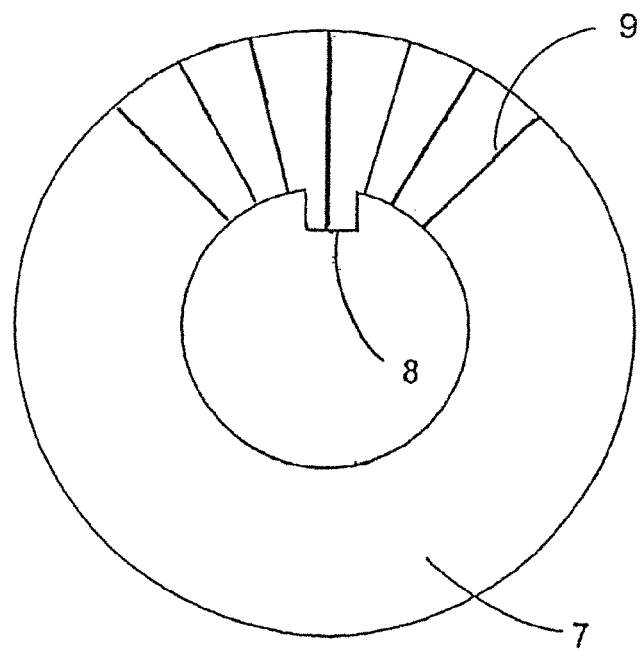
FIG. 4 is a plan view of the stationary inner washer that is positioned on the axle spindle between the inner adjustment nut and the inner race of the outer tapered roller bearing showing reference markings that assist in selecting the amount of additional back-off rotation of the adjustment nut after it has been backed off 45 degrees in accordance with TMC Recommended Practice RP 618.
Figure 5:
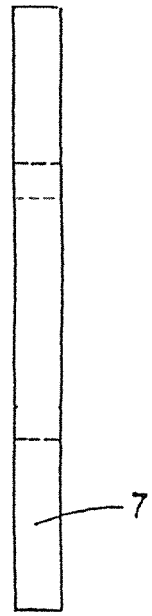
FIG. 5 is the side view of the stationary inner washer shown in FIG. 4.
Figure 6:
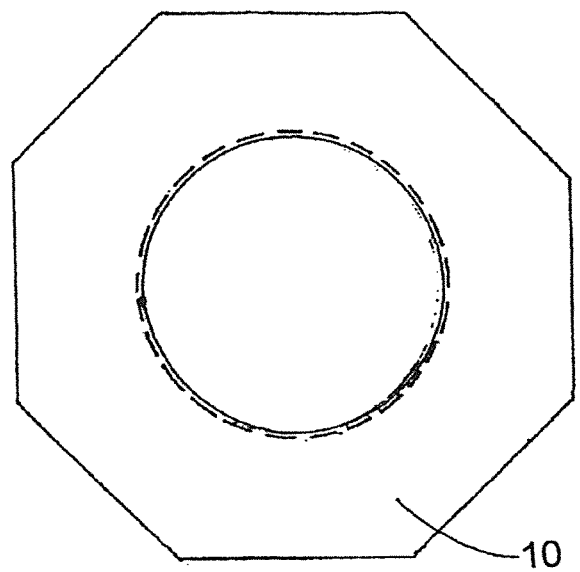
FIG. 6 is a plan view of the inner adjustment nut that is depicted with threads to engage the spindle threads.
Figure 7:
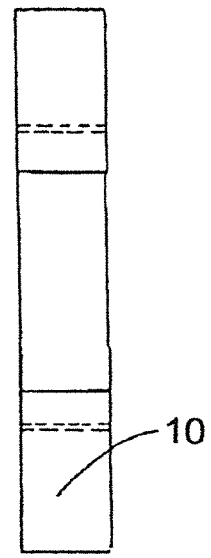
FIG. 7 is a side view of the nut shown in FIG. 6.

The invention will now be described in conjunction with the prior-art components introduced with respect to FIGS. 1 and 2. FIG. 3 is an exploded, perspective view showing the components of the preferred embodiment, which include a hardened inner washer 7, an adjustment nut 10, an intermediate interlocking washer 11, and an interlocking retainer nut 14, all mountable on the axle spindle 1. The hardened inner washer is also shown in FIGS. 4 and 5, and the adjustment nut 10 is also shown in FIGS. 6 and 7.

Figure 8:
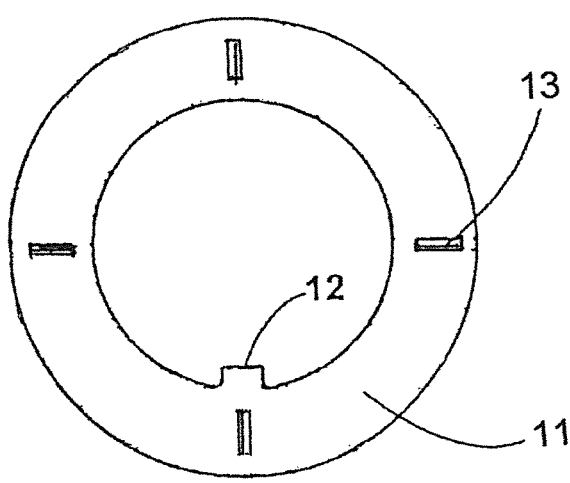
FIG. 8 is a plan view of the intermediate washer showing a plurality of projections on the outer face equally spaced to accept the grooved slots provided on the face surface of the interlocking retainer member.
Figure 9:
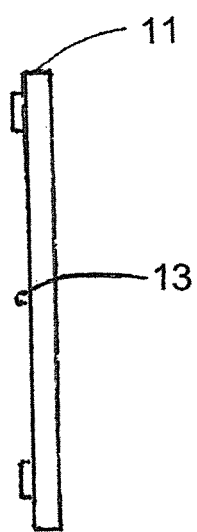
FIG. 9 is a side view of the intermediate locking washer shown in FIG. 8.
Figure 10:
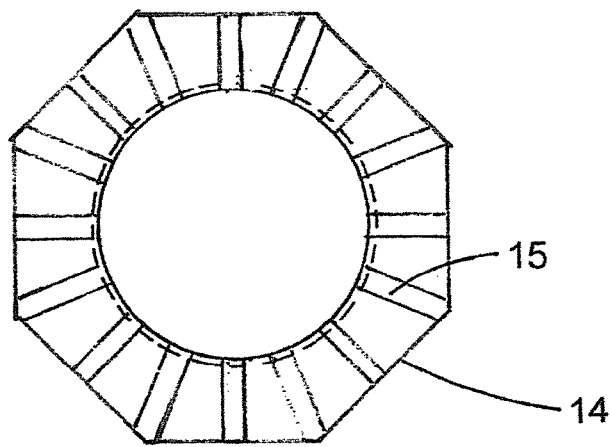
FIG. 10 is a plan view of the interlocking retainer member having a plurality of slots designed to engage with the projections provided on the face surface of the intermediate washer shown in FIG. 8.
Figure 11:
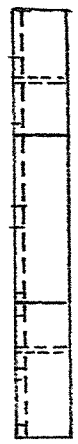
FIG. 11 is a side view of the interlocking retainer member shown in FIG. 10.
Figure 12:
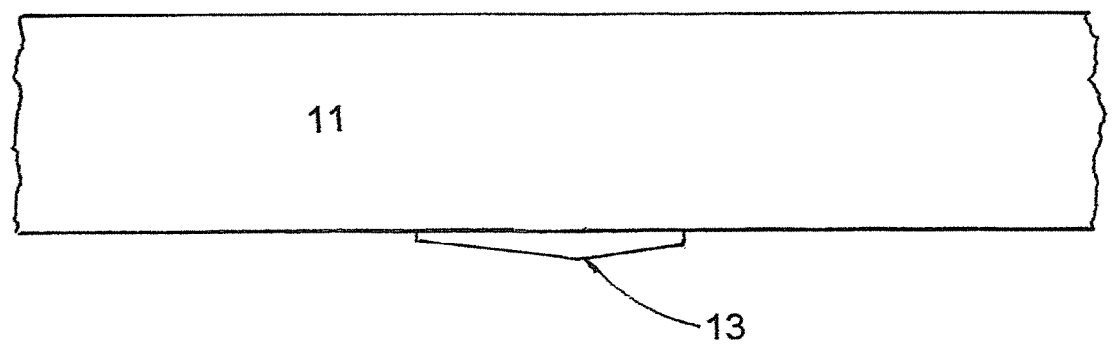
FIG. 12 is an enlarged section view taken of one of the projections shown in the plan view FIG. 8 of the intermediate interlocking washer.
Figure 13:
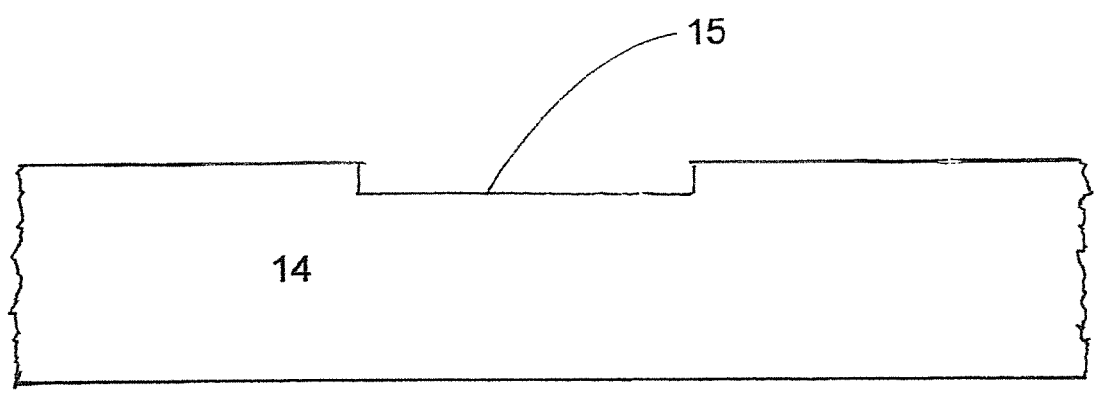
FIG. 13 is an enlarged section view taken of one of the slots shown in the plan view FIG. 10 of the interlocking retainer member.

The spindle keyway 3 serves to engage an inner projection 12 of the intermediate interlock washer 11 that is shown in detail in FIGS. 8 and 9. Projections 13 on the outer face surface of the intermediate interlock washer 11 depicted in FIGS. 8, 9 and 12 serve to engage slots on the inner face of the threaded interlock retainer nut 14 shown in detail in FIGS. 10, 11 and 13.

The assembly process provides for placement of the inner washer 7 around the threaded diameter 2 of the axle spindle 1 with the tab 8 engaged with the keyway 3. This is followed by placement of the adjustment nut 10 in position to be tightened with a specific amount of torque applied by a calibrated torque wrench (not shown). The amount of installation torque applied by the torque wrench complies with the recommendations that correlate with the relative amount of preload force against the inner and outer tapered roller bearings 15 and 16 advocated by spindle nut manufacturers for economical, reliable, and safe operations. These recommendations are also stipulated by TMC Recommended Practice RP 618 Wheel Bearing Adjustment Procedures.

Figure 17:
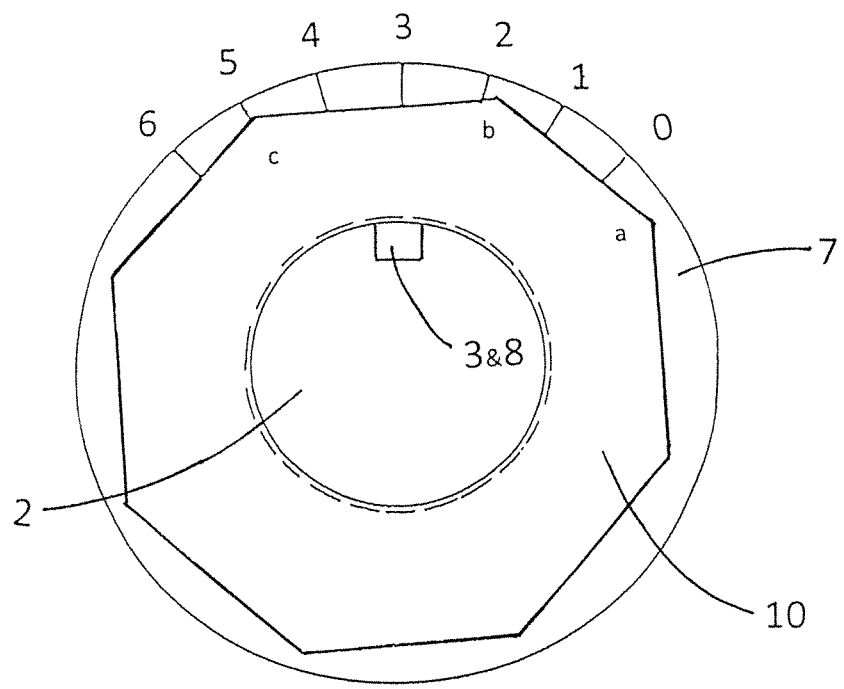
FIG. 17 is a plan view of the stationary inner washer shown in FIG. 5 in the adjacent position with respect to the inner adjustment nut shown in FIG. 6 that represents their assembled condition after the inner adjustment nut was rotated 45 degrees counterclockwise from its initial condition of 50 foot pounds of applied torque.
Figure 18:
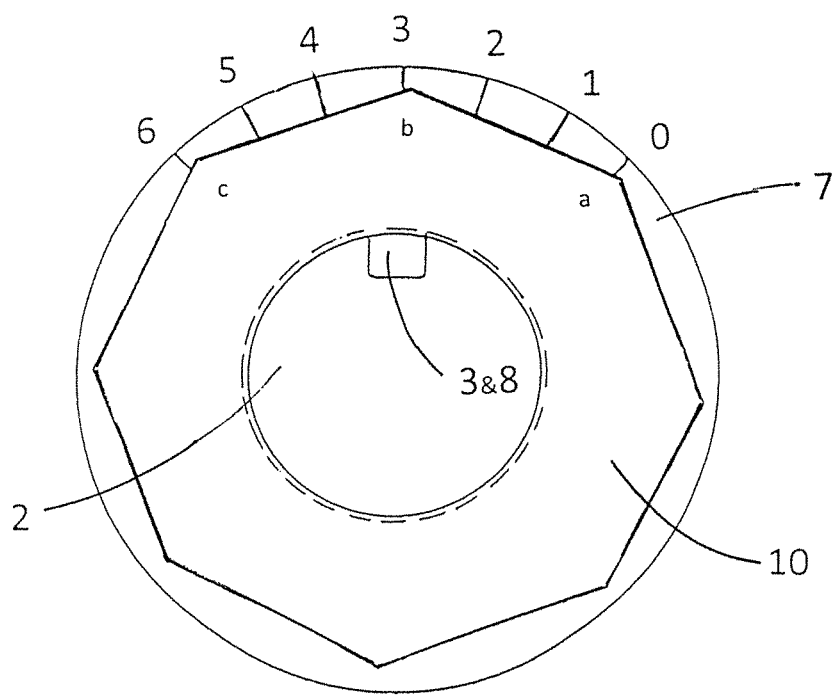
FIG. 18 is a plan view of the same components described in FIG. 17 after the adjustment nut has been rotated an additional 15 degrees in the counterclockwise direction to reach an acceptable level of preload force between zero and 2 pounds.

FIGS. 17 and 18 are provided to illustrate the significant features of the hardened inner washer 7 and its interaction with the adjustment nut 10. Controlled position axle nut (CPAN) adjustment is achieved by applying the specific 50 foot pounds of torque to the adjustment nut in accordance with TMC Recommended Practice RP 618. With the application of 50 foot pounds of torque, a correlating amount of preload is introduced to the wheel-end assembly in the order of approximately 100 pounds force. This is an excessive amount of preload force and if maintained at this level, there would be too much drag imposed within the wheel assembly and safety would be compromised. The introduction of the 50 foot pounds of torque on the adjustment nut 10 follows long established recommendations and is a basic condition well known to installers of wheel end systems. This is utilized for the purposes of this invention to serve as the initial reference level for starting the adjustment process.

Preload that occurs with 50 foot pounds of torque on the adjustment nut 10 will be in the range of 100 pounds of force when applied to the standard trailer axle 1 having a 2⅝ inch diameter spindle 2. It is the interest to reduce this amount of preload in a controlled manner to lower it to a level applying less than 5 pounds of preload force on the wheel bearings 15 and 16. This invention achieves this by controlling the amount of back-off rotation of the spindle nut 10. It has been confirmed in laboratory testing that the level of preload can be reduced from 100 pounds force in a consistent manner by controlling the number of degrees of counterclockwise rotation of the adjustment nut 10. In the case of the standard 2⅝ inch diameter trailer axle spindle 2 having a 16 pitch thread, the variations of preload change with back-off rotation of the spindle nut 10 is consistent with respect to the nut configuration involved. These variables are controllable so each independent spindle nut manufacturer has the opportunity to recommend specific back-off procedures to be employed when using their product.

This invention identifies the specific characteristics of a 2⅝ inch 16 pitch nut 10 that determines how much lateral axial movement occurs with given degrees of nut rotation. Knowing the amount of lateral axial movement of the nut 10 for each degree of rotation, it is possible to select the total number of degrees of back-off rotation that will correlate with an ideal amount of controlled preload. Laboratory studies show that 45 degrees of back-off rotation (one flat of an octagonal shaped nut) will lower the initial 100 pounds of preload force to approximately 2 pounds. From that level of adjustment, 15 degrees of additional back-off rotation of the nut 10 will reduce the preload force to a value approaching zero. One more application of counterclockwise rotation of nut 10 in the order of an additional 15 degrees of back-off rotation will introduce a change within the assembly from preload to a condition of acceptable endplay within the range of 0.001" to 0.005". Depiction of the characteristic exponential curve associated with the 2⅝ inch diameter spindle 2 having 16 threads per inch shows that ideal preload adjustment can be achieved within the 15 degree to 30 degree range of back-off rotation of nut 10 beyond the initial 45 degree back-off position.

To accomplish controlled position of the adjustment nut 10, the stationary inner washer 7 is marked with graduations that serve as reference to assist in repositioning the nut 10 to achieve the desired settings. Each marked graduation represents 15 degrees of nut rotation. After establishing the initial 45 degree back-off position of the adjustment nut 10, the apex of the adjoining flats of the adjustment nut can be moved with respect to the marked graduations 9 on the stationary washer 7 equal to the space between adjacent graduation marks. This additional 15 degrees of back-off rotation assures the amount of controlled preload within the wheel-end assembly will be at an ideal level to provide a "light amount of preload" as recommended in SAE Recommended Practice RP J2535 by all wheel bearing manufacturers. This is also the condition which assures a minimum of drag known as rotational resistance.

With back-off rotation of the apex of the flats of the adjustment nut 10 for another 15 degrees as represented by the space between two marks of reference 9 on the stationary washer 7, the controlled adjustment approaches the condition of endplay where preload is no longer applied and the amount of rotational resistance is close to zero.

Having established the desired position of either preload or endplay by controlled tightening of the adjustment nut 10, the intermediate interlock washer 11 is placed around the spindle diameter 2 to engage its tab 12 within the spindle keyway 3.

It is now necessary for an interlock mechanism to be installed that will allow controlled amount of movement of the slots 15 of the interlock retainer nut 14 into appropriate relative position to engage the projections 13 on the face of the intermediate interlock washer 11.

Figure 14:
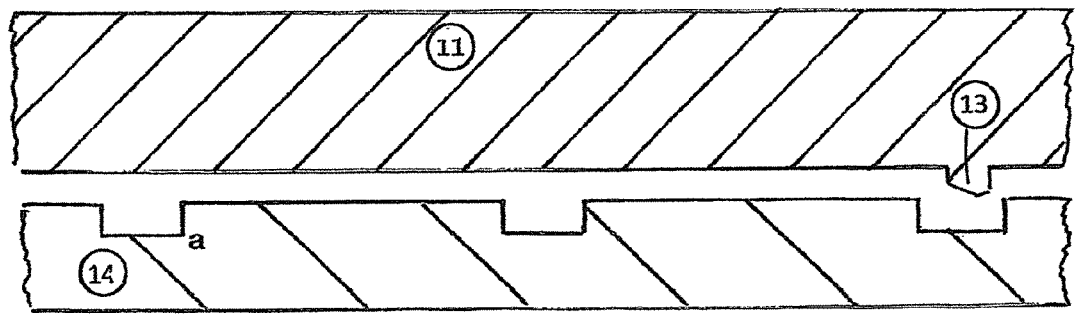
FIG. 14 is an enlarged scale side section view of a typical projection on the inner face of the interlocking retainer member shown in FIG. 8 showing its relativity to a typical slot shown on the outer face of the intermediate interlocking washer shown in FIG. 10 before contact is made as the result of inward movement of the interlocking retainer member on the mating threads of the spindle shown in FIG. 3.
Figure 15:
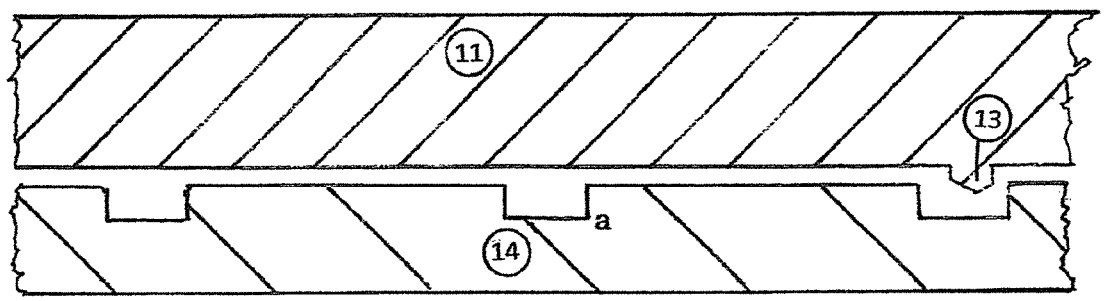
FIG. 15 is an enlarged scale side section view of same members shown in FIG. 14 after tightening rotation of the interlocking retainer member has caused it to moveaxially inward from its original position relative to the intermediate washer; and to partially engage its slot within the projection on the intermediate washer before preload force imposed by the sloped surface of the intermediate washer projection against the edge of the slot of the interlocking retainer member causes the intermediate washer to move axially inward allowing the slot to disengage from the projection.
Figure 16:
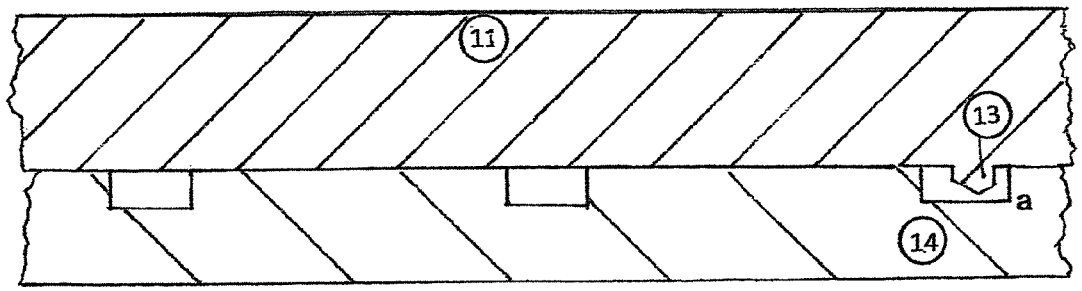
FIG. 16 is an enlarged scale side section view of the same members shown in FIGS. 14 and 15 after additional tightening rotation of the interlocking retainer member has caused it to moved further inward from its original position relative to the intermediate washer resulting in full depth engagement of the intermediate washer projection within the slot of the interlocking retainer member.

Tightening interlock retainer nut 14 is illustrated in FIGS. 14, 15 and 16. Of interest is to recognize the relationship of the interlock retainer nut slot 15 in FIG. 13. With respect to encountering the interlock washer projection 13 on the interlock washer 11, as the interlock retainer nut 14 is tightened and moves inward toward the outer face of the intermediate interlock washer 11, the interlock retainer nut slot 15 shown in FIGS. 13, 14, and 15 as "a" moves inward with respect to the projection 13 on the outer face of the intermediate interlock washer 11.

After positioning with respect to projection 13 of the intermediate interlock washer 11 is sensed, the interlock retainer nut 14 may become further positioned with respect to the intermediate interlock washer 11 by continuing to rotate it as shown in FIG. 15. Although the intermediate interlock washer projection 13 is partially positioned within the cavity of a slot in the interlock retainer nut 14, the location of the sloped surface of the projection 13 has not penetrated deeply enough to restrain further rotational movement.

Moving onward with slightly increased torque, retainer nut 14 and its interlock slot will be further rotated and will come to rest after it reaches projection 13 as shown in FIG. 16. At this stage of the assembly process, interlock retainer nut 14 cannot be rotated further because the additional depth of engagement of the intermediate washer projection 13 within the interlock retainer nut 14 slot "a" will not allow the slot to disengage as it has become restrained by not being in contact with the sloped or angled surface of the projection.

With the interlock washer projection 13 being in a captured position within the slot "a" and because the intermediate interlock washer key tab 12 is engaged within the spindle keyway 3, the intermediate interlock washer 11 and the adjoined and connected interlock retainer nut 14 are relatively secure as long as some preload force is retained within the assembly. In this condition, the assembled wheel-end fastener system components cannot be disassembled unless the preload force imposed by adjustment nut 10 against the intermediate interlock washer is removed with a manual clockwise torque application.

A secondary safety precaution to make the assembly completely secure, a follow-up step can be employed by which the inner adjustment nut 10 is rotated counterclockwise in the opposite direction from which it was originally installed and is caused to bear outward against the intermediate interlock washer 11 producing a jamming effect.

Disassembly of the interlock retainer nut 14 and the intermediate interlock washer 11 cannot be accomplished until the outward preload force applied by the interlock retainer nut 14 is relieved. The adjustment nut 10 must be rotated inward away from the intermediate interlock washer 11 before it becomes possible to disengage the projection 13 from within the slot "a" on the interlock retainer nut 14. This must be accomplished before the wheel end interlocking retainer system can be disassembled.

The unique provision of a secure connection of the intermediate interlock washer 11 to the interlock retainer nut 14 was designed to achieve correlated action between the axial penetration of the interlock retainer nut 14 and its interlock retainer nut slot "a" with the amount of rotational travel of the interlock retainer nut slot "a." The profile configuration of the interlock retainer slot "a" remains compatible with the shape of the intermediate interlock washer 11 projection 13 as shown in FIGS. 14, 15, and 16.

Once again referring to FIGS. 14, 15, and 16, the intermediate interlock washer 11 projection 13 progressively encounters three appropriately spaced interlock retainer nut 14 slots "a" before becoming restricted from further rotational movement. Only by appropriately dimensioning the interlock retainer nut slot spacing will the initial two slots pass the projection before the projection will penetrate sufficiently into the third slot where further rotation is resisted and disengagement is prevented. After the vertical face of the retainer nut slot 15 engages the vertical face of the intermediate interlock washer 11 projection 13 as shown in FIG. 16, further rotational movement of the interlock retainer nut becomes securely restrained because the intermediate interlock washer key tab 12 shown in FIG. 8 is engaged within keyway 3 shown in FIG. 1.

The introduction of preload is controlled by accurate positioning of the inner adjustment nut 10. FIG. 17 depicts a condition between the adjustment nut 10 and the inner washer 7 after the adjustment nut 10 has been rotated counterclockwise 45 degrees from its initial installation position reached with application of 50 foot pounds of torque. This relative position between the adjustment nut 10 and the inner washer 7 is illustrated showing assignment of numbers to the apexes adjacent to the flats of the octagonal adjustment nut 10 and letters to the lines of reference 9 on the inner washer 7.

FIG. 18 illustrates the change in relative position of the designated apex "a" on the adjustment nut 10 with respect to the lines of reference 9 on inner washer 7 after 15 degrees of additional counterclockwise rotation was applied to adjustment nut 10 to further reduce the amount of preload force applied by the initial adjustment torque of 50 foot pounds.

The correlated relationship between the axial movements of the retainer nut slots 11 with respect to the amount of selected spacing of the interlock retainer nut 14 projection 13 is complex. For any given combination of thread pitch and spindle diameter, the ultimate design solution must also consider the dimensional considerations of the most appropriate profiles of both the retainer nut slots 15 and the intermediate interlock washer projection 13. Numerous variables prevent assignment of standardized dimensional specifications and each spindle nut manufacturer will be required to evaluate their product accordingly.

The depth of the slots 15 on the retainer interlock nut 14 and the configuration of the projections 13 on the intermediate interlock washer 11 are such that they must interact with controlled engagement determined by a specific amount of rotation of the retainer interlock nut 14 to cause definitive penetration of the projections 13 within the slots 15 that conditions the means of engagement and the subsequent disengagement of the interlock members. With respect to trailer axles equipped having 2⅝ inch spindles with 16 pitch threads, the depth of the slots in the retainer interlock nut 14 is 0.012 inches and the peak of the projections from the face of the intermediate interlock washer 11 is 0.008 inches. The slope on the declining surfaces from the peak of the projection is such that at least 0.004 inches of interacting contact remains between the sides of the slot and the sides of the projections.

Although the invention is primarily concerned with the application of a definitively controlled preload force on the tapered roller bearings on trailer axles having 2⅝ inch diameter axles with 16 pitch threads, other purposes can be served. A number of vehicle operators prefer to install wheels on their tractor/trailer combination vehicles providing some clearance between the adjustment nut and the outer face of the bearing before securing the wheel assembly on the axle. This procedure is accomplished by backing off the adjustment nut 10 to a position where minimal installation torque on the adjustment nut 10 can be first sensed. An alternate recommended procedure is to measure the endplay (axial movement) using a dial indicator before installing the intermediate interlock washer 11 and retainer nut 14. Recommended procedures and standard operating practices for this purpose are well defined in the instructions provided from a number of sources in the trucking industry.

Having described the principles of this invention as being directed for application to tractor/trailer combination vehicles, it is anticipated any automotive vehicle will benefit by having wheels mounted and the wheel bearings similarly adjusted using the means described. Other applications may include various forms of rotating mechanisms.

The principles of this invention are not restricted to trailers and can be independently applied using engineering evaluation to satisfy applications involving axles of different specifications. However, because axle nuts are varied in design, solutions for any and all applications must consider the size and thickness, the materials selected, thread tolerances and thread pitch and other quality standards for each configuration.

While the preferred embodiment of the present invention are shown and described, it is envisioned that those skilled in the art may devise various modifications of the present invention to accommodate axles of different diameters and thread pitch without departing from the spirit and scope of the appended claims.

I claim:

1. A retaining system for establishing and maintaining a desired degree of preload force relative to tapered roller bearings mounted on a threaded axle spindle having a predetermined pitch, comprising, in order closest to the bearings:
   an inner tabbed washer having a keyway tab and an outer face inscribed with radial reference lines to serve for incremental positioning of an inner adjustment nut;
   the inner adjustment nut;
   an intermediate interlock washer with a keyway tab, an external peripheral tab, and an outer face with one or more projections providing the first portion of a mechanical interlock with an outer retainer nut;
   the outer retainer nut having an inner face providing the second portion of the mechanical interlock; and
   wherein the second portion of the mechanical interlock includes a plurality of spaced-apart physical features related to the predetermined pitch of the spindle, such that tightening the outer retainer nut causes the second portion of the mechanical interlock to become trapped by the first portion of the mechanical interlock after sufficient axial inward movement of the outer retainer nut has introduced the needed amount of additional preload force to maintain engagement of the interlock portions.

2. The retaining system of claim 1, wherein:
   the physical features of the first portion of the mechanical interlock are projections; and
   the second portion of the mechanical interlock comprises a plurality of radial slots designed to entrap the projections of the first portion of the mechanical interlock after the first portion has been forced inward with a predetermined spatial movement by tightening the outer retainer nut, thereby causing an increase of preload force needed to entrap the second portion of the mechanical interlock after the slots of the second portion become realigned with the projections of the first portion.

3. The retaining system of claim 2, wherein:
   the physical features of the first portion of the mechanical interlock includes a plurality of projections of the intermediate interlock washer designed to be trapped by the slots of the outer retainer nut; and
   the second portion of the mechanical interlock includes a plurality of radially oriented slots of the outer retainer nut having a straight sided configuration designed to engage the projections of the first portion of the mechanical interlock having shaped configurations that allow disengagement of the projections from within the slots until a predetermined depth of engagement enables the sides of the projections and the sides of the slots to become resistant to disengagement.

4. The retaining system of claim 2, wherein the physical features of the first and second portions of the mechanical interlock are such that the depth of engagement is established by the pitch of the threads of the components involved and the degrees of rotation applied to the outer retainer nut in the interest of controlling the depth of penetration of the projections of the first portion within the second portion at which point disengagement of the two portions of the mechanical interlock is effectively resisted.

5. The retaining system of claim 2, wherein, once the controlled position of the first and second portions of the mechanical interlock has been established, the assembled components can be further secured by bending the peripheral tab of the intermediate interlock washer over the flat of the outer retainer nut to prevent inadvertent movement.

6. The retaining system of claim 2, wherein, once the controlled position of the first and second portions of the mechanical interlock has been established, additional mechanical integrity is achieved by applying a measure of torque with counterclockwise rotation to the adjustment nut resulting in a jammed condition within the components.

7. The adjustment system of claim 1, wherein the inner tabbed washer is marked with radial reference lines in 15 degree segments to aid in the appropriate positioning of the inner adjustment nut.

8. The adjustment system of claim 7, wherein the 15 degree segments are used to produce a level of preload after the installation torque of 50 foot pounds has been reduced to realize preload force between 0 and 2 pounds force achieved by 45 degrees of counterclockwise rotation of the adjustment nut within the predetermined range applicable to trailer axles having 2⅝ inch spindles with 16 threads per inch.

9. The adjustment system of claim 7, wherein the 15 degree segments are used to produce a level of endplay after the installation torque of 50 foot pounds has been reduced to realize an endplay adjustment between 0.000" and 0.005" achieved by 30 degrees of counterclockwise rotation of the adjustment nut within the predetermined range applicable to trailer axles having 2⅝ inch spindles with 16 threads per inch.

10. A method of establishing and maintaining controlled preload or endplay relative to tapered roller bearings mounted on a threaded axle spindle having a predetermined pitch and a keyway, the method comprising the steps of:
    placing a tabbed inner washer on the spindle with the tab engaged with the keyway;
    placing an inner adjustment nut on the spindle against the inner washer;
    tightening the adjustment nut with approximately 50 foot pounds of torque;
    backing off the adjustment nut with a predetermined degree of rotation;

placing an intermediate washer having a peripheral tab onto the spindle against the adjustment nut with the tab engaged within the keyway;

placing an interlock retainer nut having a plurality of outer flats onto the spindle against the intermediate interlock washer;

wherein the intermediate interlock washer and interlock retainer nut have adjoining faces with coordinating spaced-apart projections and recesses;

tightening the interlock retainer nut; and bending the peripheral tab on the intermediate interlock washer over a flat on the interlock retainer nut and applying back-off rotation of the inner adjustment nut to achieve a jammed condition between the inner adjustment nut and the interlock retainer nut.

11. The method of claim 10, wherein the steps are used to establish and maintain a controlled level of preload force, including the steps of:

backing off the adjustment nut with approximately 45 degrees of rotation to achieve a desired level of rotational resistance (DRAG) when turning the wheel; and tightening the interlock retainer nut until the projections penetrate into the recesses to the degree that restricts further tightening.

12. The method of claim 10, wherein the steps are used to establish and maintain a controlled level of endplay, including the steps of:

backing off the adjustment nut with approximately 50-60 degrees of rotation to achieve an acceptable amount of endplay in compliance with TMC Recommended practices; and finger-tightening the interlock retainer nut until the projections initially partially engage the recesses while avoiding deep penetration of the interlocking components.

13. The method of claim 10, wherein the tabbed inner washer includes radial indicators at 15 degree increments to assist in backing off the adjustment nut by a desired degree of rotation.

14. The method of claim 10, wherein:

the tabbed inner washer includes radial indicators at 15 degree increments;

the adjustment nut is octagonal with flats and apexes; and the apexes of the adjustment nut are compared to the radial indicators to assist in backing off the adjustment nut by a desired degree of rotation.

15. The method of claim 10, wherein the spindle has a 2⅝ inch diameter and 16 threads per inch.

16. The method of claim 10, wherein the projections have sloped or angled surfaces that interact with the recesses during the tightening process.

17. The method of claim 10, including radially oriented projections and grooved recesses.

* * * * *